United States Patent
Cao et al.

(10) Patent No.: US 11,061,709 B2
(45) Date of Patent: Jul. 13, 2021

(54) STORAGE MANAGEMENT FOR DEPLOYMENT OF VIRTUAL MACHINE

(71) Applicant: INTERNATIONAL BUSINESS MACHINES CORPORATION, Armonk, NY (US)

(72) Inventors: Biao Cao, Beijing (CN); Shi Lin Huang, Beijing (CN); Yi Chun Huang, Beijing (CN); Shuang Li, Beijing (CN); Hong Gang Liu, Shanghai (CN); YaLian Pan, Beijing (CN); Huang Rui, Beijing (CN); Na Fei Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/108,028

(22) Filed: Aug. 21, 2018

(65) Prior Publication Data

US 2020/0065254 A1    Feb. 27, 2020

(51) Int. Cl.
*G06F 9/455*    (2018.01)
*G06F 12/10*    (2016.01)

(52) U.S. Cl.
CPC .......... *G06F 9/45558* (2013.01); *G06F 12/10* (2013.01); *G06F 2009/45583* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,656,386 B1 | 2/2014 | Baimetov et al. | |
| 8,738,884 B2 | 5/2014 | Factor et al. | |
| 8,789,041 B2 | 7/2014 | Verma | |
| 8,819,369 B1 * | 8/2014 | Alappat | G06F 11/1484 711/162 |
| 9,632,835 B2 | 4/2017 | Greden et al. | |
| 2015/0378849 A1 * | 12/2015 | Liu | G06F 16/188 711/162 |
| 2016/0034290 A1 * | 2/2016 | Christenson | G06F 9/45558 718/1 |

(Continued)

OTHER PUBLICATIONS

Laurikainen et al., "Improving the Efficiency of Deploying Virtual Machines in a Cloud Environment," International Conference on Cloud Computing and Service Computing, 2012, p. 232-239, IEEE Computer Society.

(Continued)

*Primary Examiner* — Charles J Choi
(74) *Attorney, Agent, or Firm* — Rakeesh Roy (57) ABSTRACT

A method, computer system, and a computer program product for storage management for deployment of a virtual machine is provided. The present invention may include receiving a request to deploy a virtual machine based on a master VM image. The present invention may also include determining a free disk space for the virtual machine. The present invention may then include determining a disk storage space storing the master VM image. The present invention may further include mapping the disk storage space and the free disk space into a single virtual storage. The present invention may include designating the single virtual storage to be a virtual storage of the virtual machine.

14 Claims, 7 Drawing Sheets

(56) References Cited

U.S. PATENT DOCUMENTS

2017/0249182 A1    8/2017    Hegdal et al.

OTHER PUBLICATIONS

Mell et al., "The NIST Definition of Cloud Computing," National Institute of Standards and Technology, Sep. 2011, p. 1-3, Special Publication 800-145.

Schmidt et al., "Efficient Distribution of Virtual Machines for Cloud Computing," 18th Euromicro Conference on Parallel, Distributed and Network-based Processing, 2010, p. 567-574, IEEE Computer Society.

* cited by examiner

Logical Address of Virtual
Storage of New VM
780

| 0 | 1 | ... | 4095 | 4096 | 4097 | | ... | ... | 12287 |

| 0 | | 4095 |

781
Physical Address of Disk
Storage Space Storing VM
Image

| 0 | | 8191 |

782
Physical Address of
Free Disk Space

STORAGE MANAGEMENT FOR DEPLOYMENT OF VIRTUAL MACHINE

BACKGROUND

The present invention relates to virtualization techniques, and more specifically, to deployment of virtual machines.

A virtual machine (VM) is an emulation of the general structure of a physical computer and usually has both virtual system hardware and guest system software. To deploy a virtual machine, it is necessary to allocate hardware resources to the virtual machine, for example, through a hypervisor. The hardware resources include such components as CPU, memory, network, storage device, and so on.

The storage device allocated to the virtual machine is also called virtual disk. The virtual disk may be a physical disk or disk partition. The virtual disk may be located on the host machine that hosts the virtual machine or in a remote storage system accessible via network connections.

SUMMARY

According to an embodiment of the present invention, a computer-implement method comprises receiving a request to deploy a virtual machine based on a master VM image. A free disk space for the virtual machine is determined. A disk storage space storing the master VM image is determined. The disk storage space and the free disk space are mapped into a single virtual storage. The virtual storage is designated to be a virtual storage of the virtual machine.

According to another embodiment of the present invention, a computer-implemented system is provided. The system comprises a computer processor coupled to a computer-readable memory unit. The memory unit comprises instructions that when executed by the computer processor implements a method. According to the method, a request to deploy a virtual machine based on a master VM image is received. A free disk space for the virtual machine is determined. A disk storage space storing the master VM image is determined. The disk storage space and the free disk space are mapped into a single virtual storage. The virtual storage is designated to be a virtual storage of the virtual machine.

According to another embodiment of the present invention, it is provided a computer program product being tangibly stored on a non-transient machine-readable medium and comprising machine-executable instructions, the instructions, when executed on an electronic device, causing the electronic device to receive a request to deploy a virtual machine based on a master VM image. The instructions further cause the electronic device to determine a free disk space for the virtual machine. The instructions further cause the electronic device to determine a disk storage space storing the master VM image. The instructions further cause the electronic device to map the disk storage space and the free disk space into a single virtual storage. The instructions further cause the electronic device to designate the virtual storage to be a virtual storage of the virtual machine.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Throughout the drawings, same or similar reference numerals represent the same or similar elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
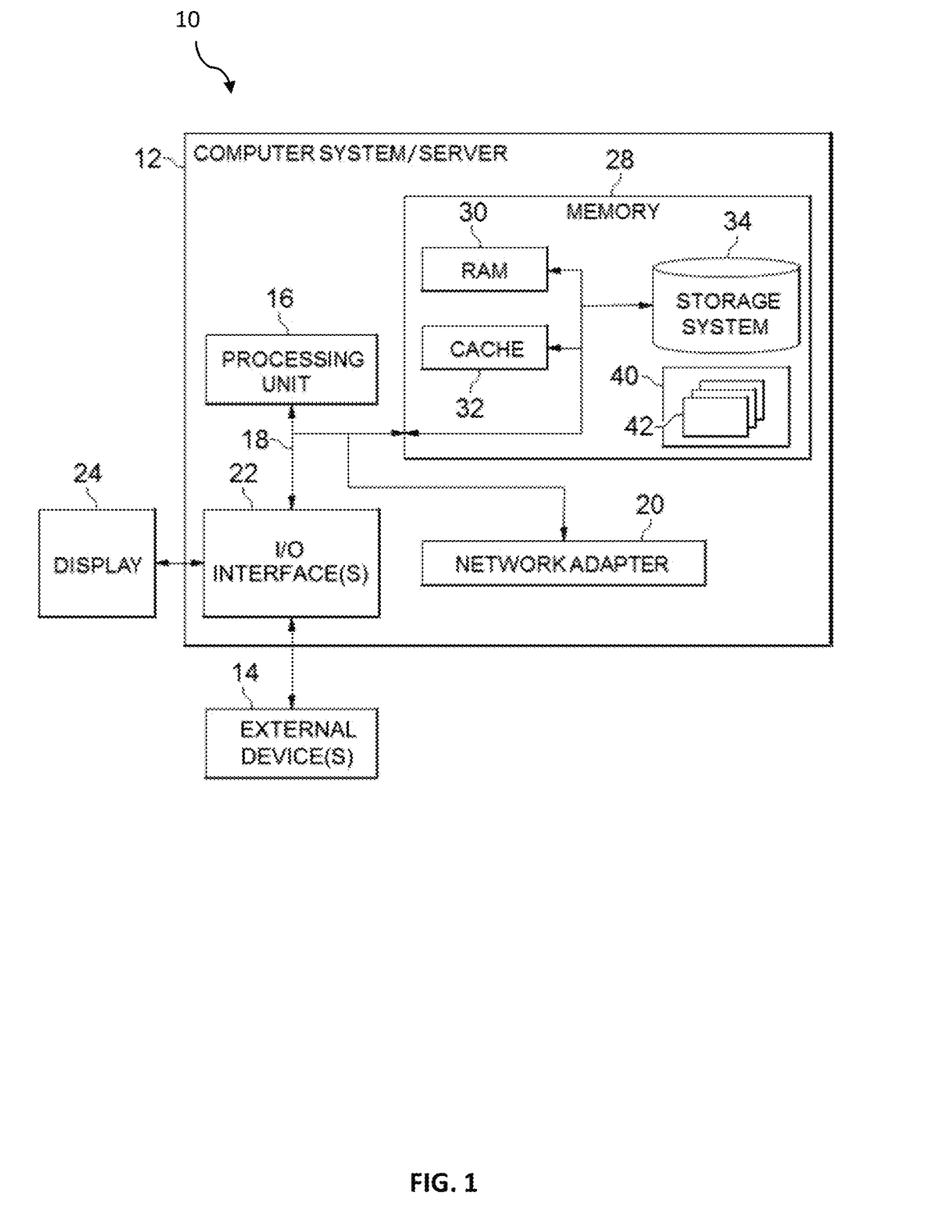
FIG. 1 illustrates a cloud computing node according to at least one embodiment.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
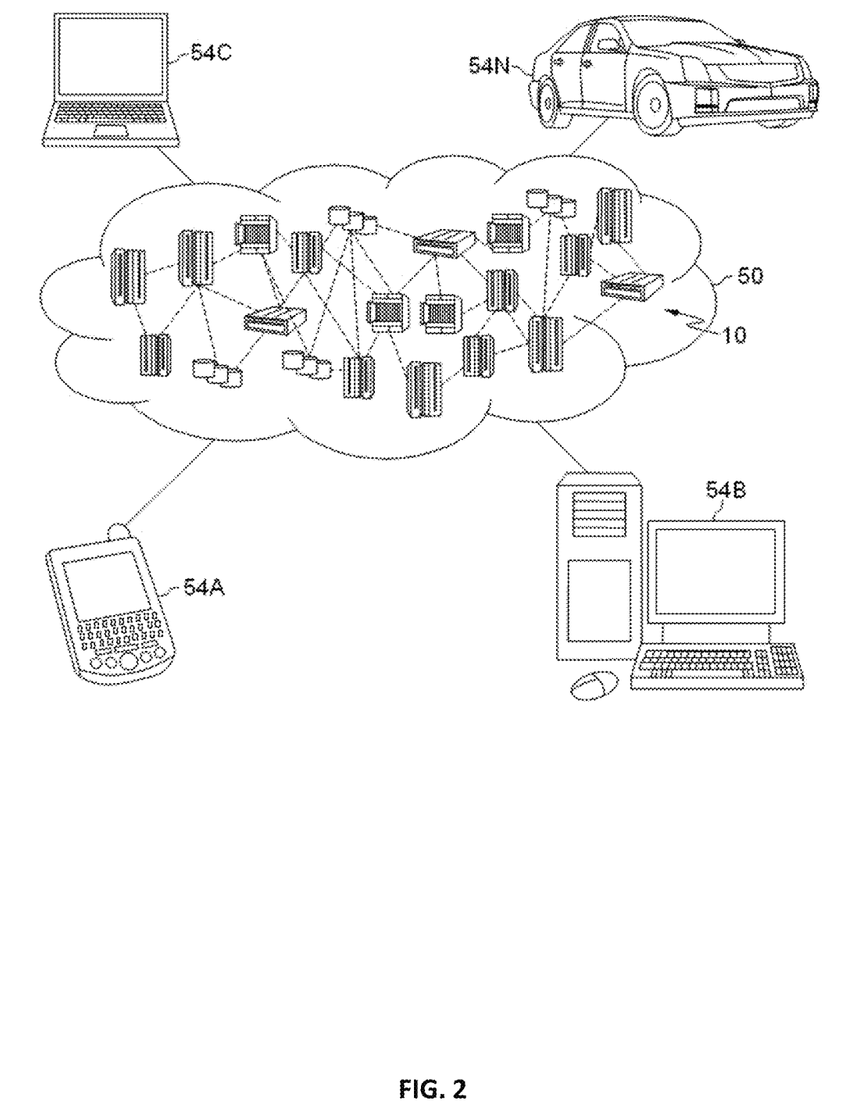
FIG. 2 illustrates a cloud computing environment according to at least one embodiment.

Referring now to FIG. 2, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
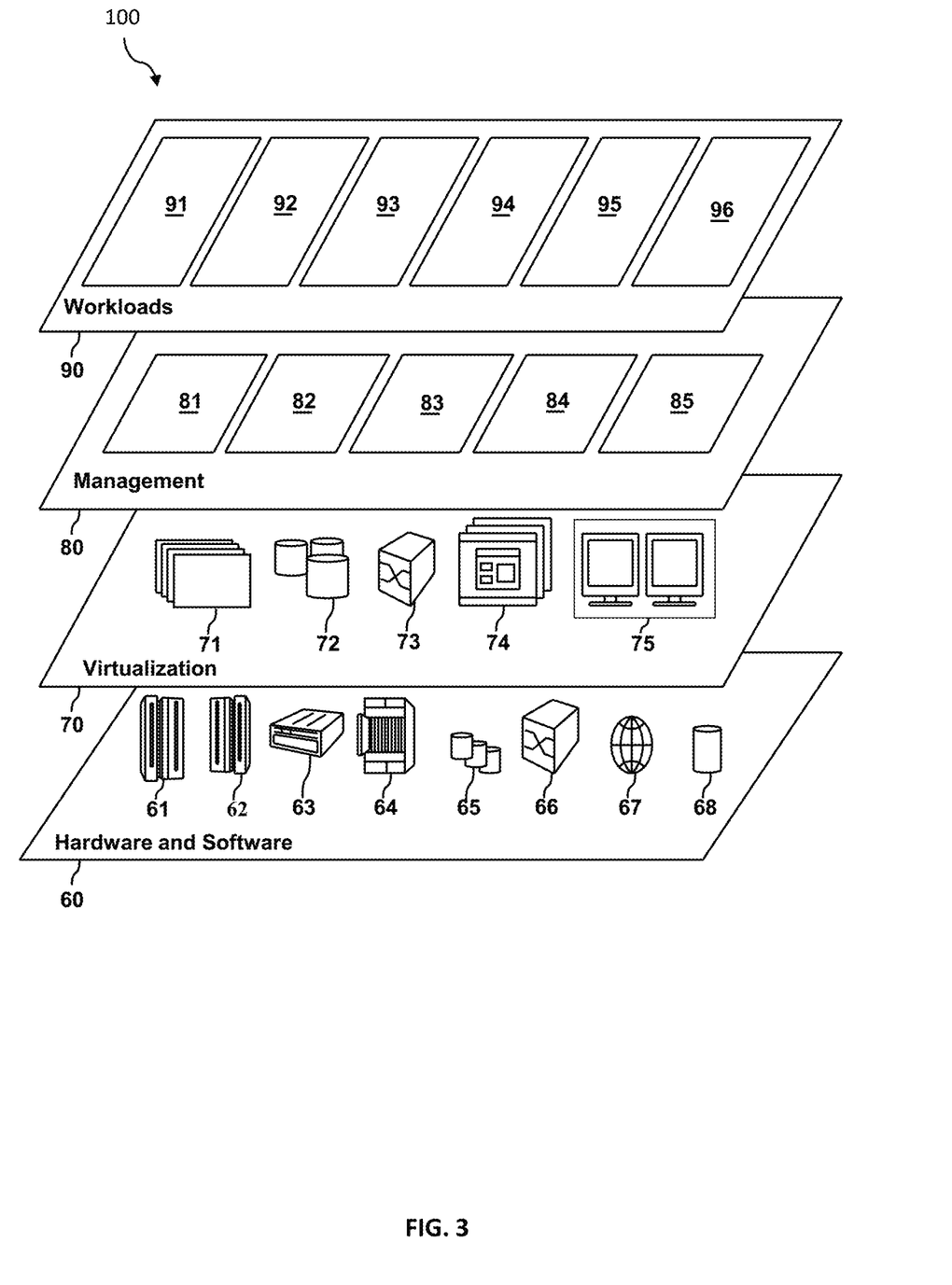
FIG. 3 illustrates abstraction model layers according to at least one embodiment.

Referring now to FIG. 3, a set of functional abstraction layers 100 provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. Service processing 96 may implement a solution for storage management for deployment of virtual machines. The solution comprises: receiving a request to deploy a virtual machine based on a master VM image; determining a free disk space for the virtual machine; determining a disk storage space storing the master VM image; mapping the disk storage space and the free disk space into a single virtual storage; and designating the virtual storage to be a virtual storage of the virtual machine.

Typically, a new virtual machine may be deployed by cloning an existing source virtual machine. To deploy the new VM, an image of the state of the file system of the existing virtual machine, which may be captured or otherwise determined in advance, will be copied to the storage associated with the new VM. The copying operation involves transferring data from the storage of the source VM to the storage associated with the new VM.

With reference now to FIGS. 4-7, exemplary embodiments of the present disclosure will be described. The exemplary embodiments are directed to a method, system and computer program product for storage management for deployment of a virtual machine.

Figure 4:
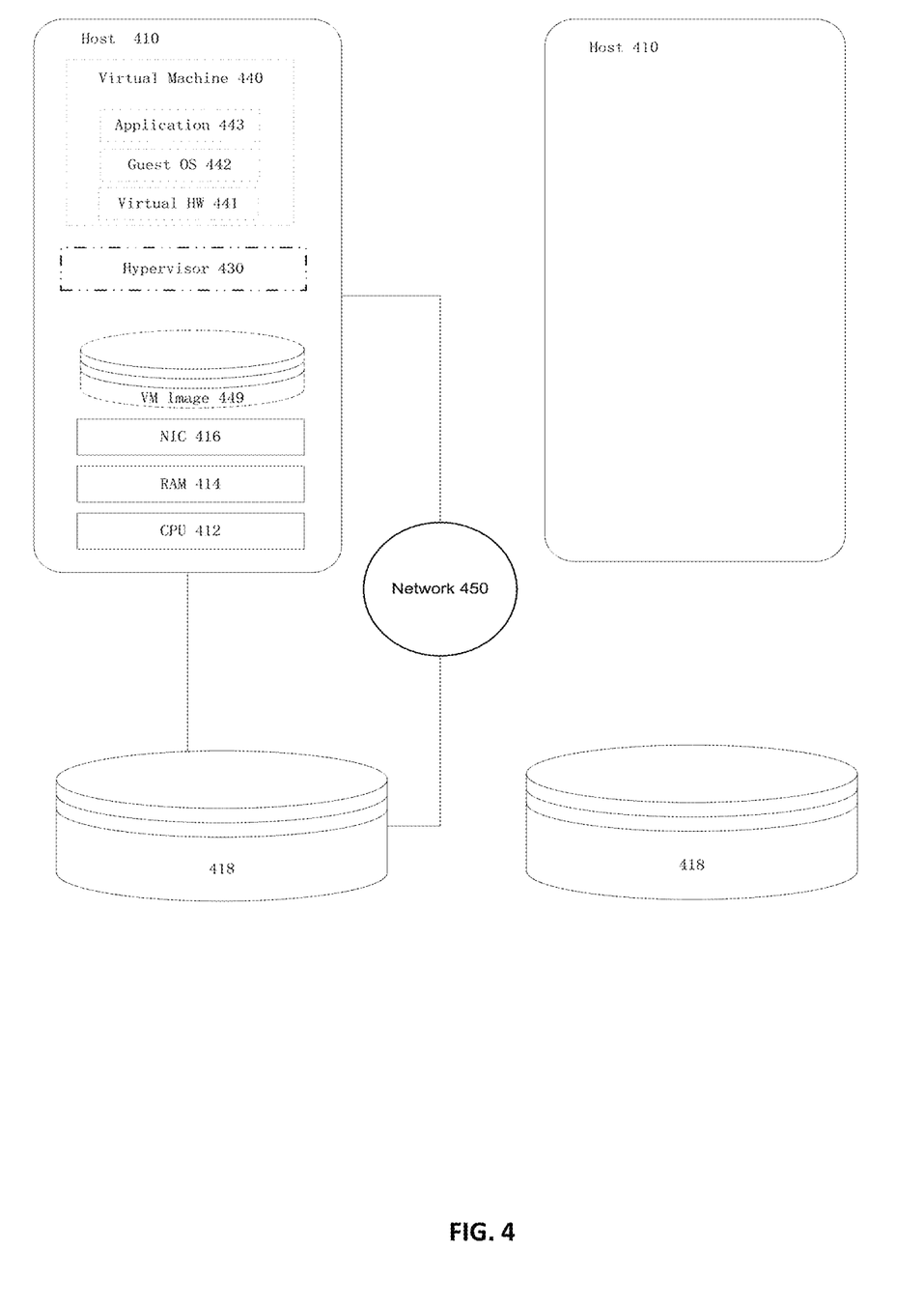
FIG. 4 is an exemplary illustration of an environment in which one embodiment of the present disclosure may be implemented.

Referring now to FIG. 4, an exemplary illustration of a computing environment in which embodiments of the present disclosure may be implemented is depicted.

FIG. 4 illustrates one or more host devices 410 in a computing environment in which embodiments of the invention may be implemented. Typically, a host device (a "host") may include a desktop computer, a laptop, or a server computer capable of implementing a virtualized system architecture. Accordingly, hosts 410 as shown in FIG. 4 may also be of any type of computing devices, such as desk computers, server computers, and the like, such as the desktop computer MB illustrated in FIG. 2.

FIG. 4 illustrates a typical host 410 which is representative of hosts 410 that may be communicatively connected with each other via a network 450. The host 410 as shown includes a hardware platform, a virtual machine execution space, and a hypervisor 430.

The hardware platform includes one or more CPUs 412, a memory (e.g., RAM) 414, a network interface (NIC) 416 and a storage device 418.

The hardware platform may include one or more storage devices 418 that may be directly connected to host 410 or may be accessed by host 410 via network 450. In some embodiments, storage device 418 may be a single disk storage medium. In other embodiments, storage device 418 may include a SCSI, Fiber Channel, or iSCSI storage array. The storage array may be of any type, such as a network-attached storage (NAS) filer or a block-based device over a storage area network (SAN). Storage device 418 may be dedicated to a single host 410, or it may be shared among two or more hosts 410.

The virtual machine execution space of host 410 accommodates one or more virtual machines 440. A virtual machine (VM) may include a software implementation of a physical computer. As shown in FIG. 4, VM 440 may include a virtual hardware platform 441, a guest operating system (OS) 442, and one or more guest applications 443. Virtual hardware platform 441 may include emulated hardware such as a virtual CPU, a virtual memory and a virtual storage and supports the installation of guest operating system 442 which is capable of executing guest applications 443. An example of a guest operating system may include MICROSOFT WINDOWS® (Microsoft Windows and all Microsoft-based trademarks and logos are trademarks or registered trademarks of Microsoft Corporation and/or its affiliates) and the like.

Further, the state of VM 440 (e.g., the contents of virtual memory, the contents of virtual disk storage, and the execution state of virtual CPUs) may be represented in data stored in one or more data files that may comprise a VM image 449 within the storage device 418. In some embodiments, the data files comprising a VM image 449 may include one or more files storing, virtual disk contents, virtual hardware configuration data for VM 440, log data for VM 440 that can be used for troubleshooting, and other data files which may fully describe the current state of VM 440. VM image 449 corresponding to VM 440 may also be referred to as a "source image 449", a "master image 449," or simply a "VM 449".

Host 410 may also include a hypervisor 430 that may manage hardware resources encapsulated in the hardware platform and may enable the execution of VM 440 in the virtual machine execution space. For each virtual machine 440, the hypervisor 430 may manage the virtual hardware platform 441 that includes emulated hardware such as virtual CPUs and virtual storage. One example of hypervisor 430 may include a component of VMWARE VSPHERE® (VMware vSphere and all VMware-based trademarks and logos are trademarks or registered trademarks of VMware, Inc and/or its affiliates).

In the computing environment illustrated in FIG. 4, it may be necessary to deploy a new VM, typically, by cloning an existing VM. For example, the new VM may be deployed to run as a database or as print servers.

A typical process for the deployment of the new VM based on the existing VM may include the following steps:

Step 1: receiving a request to deploy a new VM on a target host based on an existing VM 440 residing on a source host 410;

Step 2: allocating hardware resources to the new VM, the hardware resources including a storage device or a free disk space. In other words, a free disk space is allocated to the target host on which the new VM is to be deployed;

Step 3: accessing the data files of VM image 449 stored in a disk storage space in, for example, source storage device 418 for the existing VM; and Step 4. transmitting a copy of VM image 449 to the target host and storing it into the free disk space associated with the target host.

Upon completion of storing the copy of VM image 449 to the target host, the new VM may be deployed prior to being started to execute on the target host.

One of the problems in the above process may be that the transmission operation and the storing operation in Step 4 is time-consuming. This may be particularly true if the source host and the target host are separate and geographically distant from each other. As such, the transmission of the VM image may need to be transmitted via a network and the transmission speed may be slowed down due to unstable network conditions, leading to an inefficiency in the deployment of the new VM.

To address the problem, the present embodiment may include making the source VM image directly accessible by the target host, instead of being copied to the target host.

Figure 5:
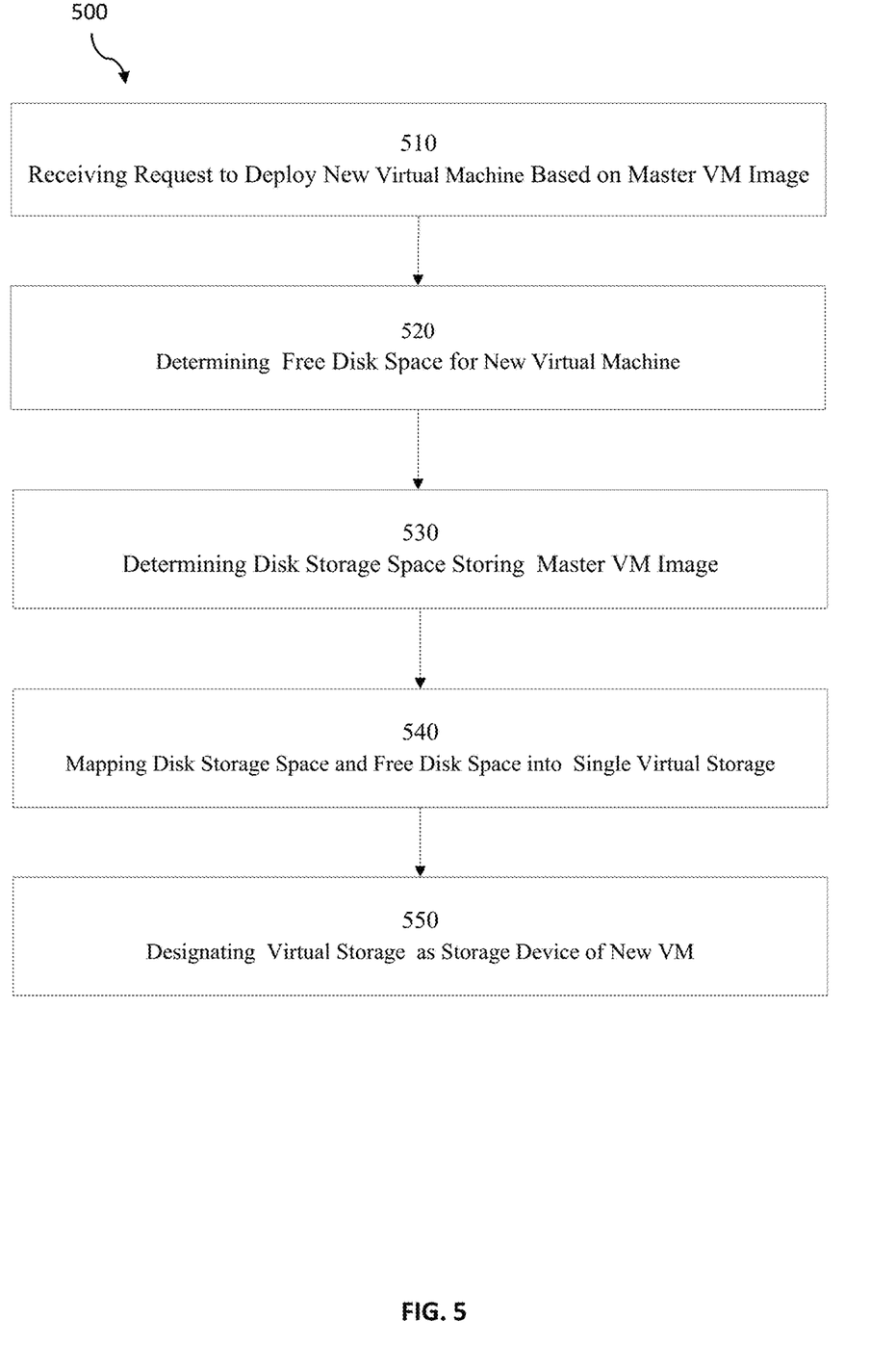
FIG. 5 is an operational flowchart illustrating a general process of a method according to at least one embodiment.

Referring now to FIG. 5, an operational flowchart illustrating the exemplary process 500 for managing storage in deploying a virtual machine according to at least one embodiment is depicted. Process 500 may include receiving a request to deploy a new virtual machine based on a master VM image. Then, a free disk space for the virtual machine may be determined. Further, a disk storage space storing the master VM image may be determined. Then, the storage space and the free disk space may be mapped into a single storage device for the virtual machine to be deployed. The process 500 will be further detailed in the following paragraphs.

At 510, a request to deploy a virtual machine based on a master VM image is received. In one embodiment, such a request may be due to a need for an additional virtual machine to execute a task, for example, to serve as a database server. The request may be made, through a user interface or other input mechanism, by, for example, a system administrator. The operation at 510 may be performed similarly to Step 1, as described with reference to FIG. 4.

In one embodiment, the request at 510 may specify, among other things, the master VM image, the target host to which the virtual machine may be deployed, and the hardware resources, including the storage to be allocated to the target host for the virtual machine.

Then, at 520, a free disk space for the virtual machine is determined. In one embodiment, the free disk space may be determined similarly to Step 2, as described with reference to FIG. 4, in which a free disk space may be determined as a part of the hardware resources to be allocated to the new VM. For example, it may be determined based on a specification in the request or may be determined according to pre-defined strategies, as practiced in known techniques. As implementing details of the operation are not the focus of the present disclosure, the implementing details of the operation will be omitted here so as not to obscure the core idea of the present disclosure.

Figure 6:
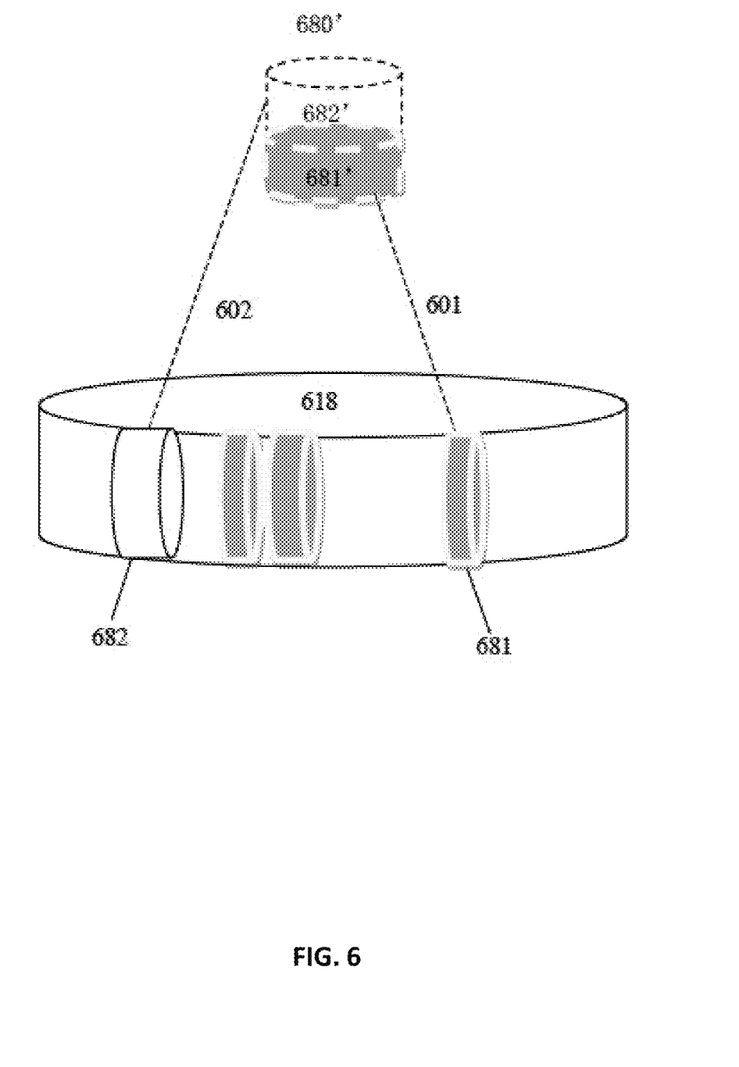
FIG. 6 illustrates a storage system according to at least one embodiment.

Referring now to FIG. 6, which illustrates a storage system according to at least one embodiment of the present disclosure. FIG. 6 illustrates a storage device 618 as representative of storage devices 418 described in FIG. 4. As shown, the storage device 618 includes a plurality of disk partitions, for example, a disk partition 681 and a disk partition 682. For ease of description, in the following paragraphs, the free disk space referred to in 520 of the process 500, may include, for example, the disk partition 682. Thus, in the following paragraphs, the reference number 682 will also represent the free disk space determined at 520.

Figure 7:
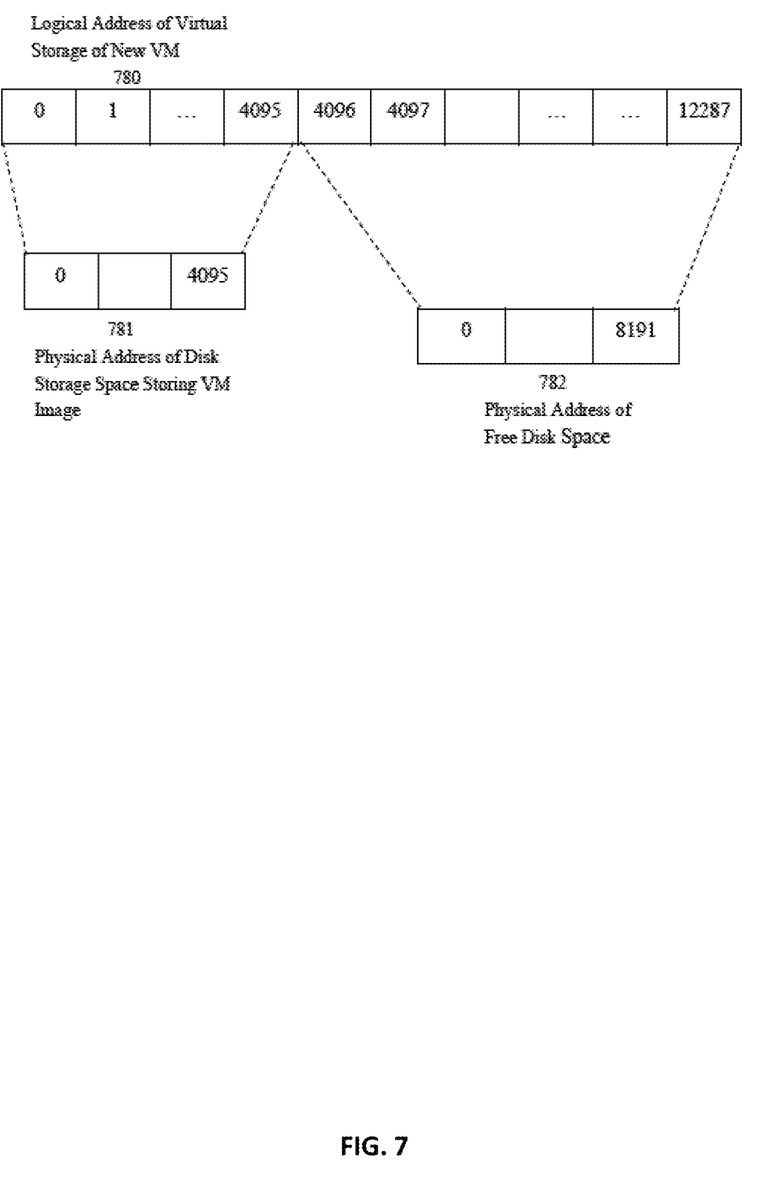
FIG. 7 illustrates a simplified address mapping scheme according to at least one embodiment.

It shall be appreciated that free disk space 682 may be defined by a start address and an end address within storage device 618, as illustrated in FIG. 7, which illustrates a simplified address mapping scheme according to an embodiment of the present disclosure. FIG. 7 illustrates three address ranges: 780, 781 and 782. For ease of description, in the following paragraphs, the free disk space 682 may be defined by address range 782. As shown, the starting address of address range 782 is 0, and thus the start address of free disk space 682 is 0 and the end address of free disk space 682 is 8191. It may be appreciated that both the start address and the end address are relative to a base address of free disk space 682, as is well known in the art.

In one embodiment, the free disk space 682 may be also be defined by a start address and a size of the free disk space, as is readily understood by those skilled in the art. As such, the starting address may be, for example, 0, and the size may be 8192 bytes.

Referring back to FIG. 5, at 530, a disk storage space storing the master VM image is determined. For ease of description, in the following paragraphs, it may be assumed that the master VM image is VM image 449 stored in storage device 618. The disk storage space may be acquired from hypervisor 430.

With additional reference to FIG. 6, for ease of description, in the following paragraphs, it may be assumed that, at 530, the disk storage space may be, for example, a disk partition 681 of the storage device 618. Thus, in the following paragraphs, the reference number 681 may also represent the disk storage space determined at 530. Similar to free disk space 682, the disk storage space 681 may be defined by a start address and an end address within storage device 618, as illustrated in FIG. 7. For ease of description, in the following paragraphs, it may assumed that disk storage space 681 may be defined by address range 781. As illustrated in FIG. 7, the starting address of address range 781 is 0, and thus the start address of the disk storage space 681 is 0 and the end address of the disk storage space 681 is 4095. It may be appreciated that both the start address and the end address may be relative to a base address of the disk storage space 681.

Similarly, the disk storage space 681 may also be defined by a start address and a size of the disk storage space, as is readily understood by those skilled in the art. As such, the start address of the disk storage space 681 may be, for example, 0, and the size may be 4096 bytes.

It is to be noted that the address range for disk storage space 681, as well as the address range for free disk space 682, is only illustrative for simplicity and ease of understanding.

Further, although disk storage space 681 and free disk space 682 are depicted as different storage areas of a storage device 618, they may be within different storage devices located remotely from each other.

Referring back to FIG. 5, at 540, the disk storage space and the free disk space is mapped into a single virtual storage. Then, at 550, the virtual storage is designated to be a storage device of the VM. As a result, the virtual storage is associated with the new VM to be deployed.

With additional reference to FIG. 6, a virtual storage 680' may result from execution of 540 and 550 in FIG. 5. The virtual storage 680' may constitute a part of the virtual hardware platform associated with the VM, such as the virtual hardware platform 441 described with reference to FIG. 4. As detailed with reference to FIG. 4, the virtual hardware platform associated with the VM may also include a virtual CPU and a virtual memory (not specifically shown).

In one embodiment, virtual storage 680' may include two parts: 681' and 682'. The first part 681' may represent the disk storage space 681 that is determined at 530, as indicated by a dotted line 601. The second part 682' may represent the free disk space 682 that is determined at 520, as indicated by another dotted line 602.

According to an embodiment of the invention, a part of the virtual storage corresponding to the disk storage space may be indicated as a storage location containing the master VM image. For example, the first part 681' may be indicated to be storing the master VM image.

As may be appreciated, since virtual storage 680' may be associated with the new VM, the master VM image stored in disk storage space 681 of virtual storage 680' may be directly accessed by the target host 410 to which the VM may be deployed. In other words, target host 410 may now be enabled to access the data files of the master VM image without having to wait until they are copied to the storage device associated with the VM to be deployed.

According to an embodiment of the invention, mapping the disk storage space and the free disk space into a single virtual storage may include mapping physical addresses of the disk storage space and physical addresses of the free disk space to consecutive logical addresses of the virtual storage of the virtual machine. This is illustrated in FIG. 7 and detailed below.

As shown in FIG. 7, as previously discussed, for the disk storage space 681 that contains the source VM image, the size may be 4096 bytes and the address range 781 may be from 0 to 4095 relative to its base address. For the free disk storage space 682, the size may be 8192 bytes and the address range 782 may be from 0 to 8191 relative to its base address. According to at least one embodiment, the address range 781 and the address range 782 may be mapped to an address range 780 of the virtual storage of the new VM, which may be from 0 to 12287.

The operation of the address mapping is well known. In practice, the operation may be performed, for example, by hypervisor 430 on host 410 to which the new VM will be deployed.

Address range 780 may be used by the file system (not specifically shown) of the VM. From the point of view of the VM, the logical addresses in address range 780 may be consecutive or continuous. Each of the logical addresses may be mapped to an address of either disk storage space 681 or free disk space 682.

According to an embodiment, a sub-range of the logical addresses may be recorded to be corresponding to the disk storage space storing the VM image. For example, 0 to 4095 of logical address 780 may be recorded. In this way, a part of the virtual storage corresponding to the disk storage space may be indicated as a storage location containing the master VM image.

According to an embodiment, the sub-range of the logical addresses corresponding to the disk storage space storing the VM image may be set to read-only mode for the virtual machine. For example, 0 to 4095 of logical address 780 may be set to read-only, so that the data files of the VM image will remain intact without risk of being re-written.

It may be appreciated that FIGS. 4-7 provide only an illustration of one embodiment and do not imply any limitations with regard to how different embodiments may be implemented. Many modifications to the depicted embodiment(s) may be made based on design and implementation requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storage management for deployment of a virtual machine, the method comprising:
   receiving a request to deploy a virtual machine on a target host based on a master virtual machine (VM) image, wherein the master VM image includes data associated with a current state of the virtual machine, wherein the current state of the virtual machine comprises virtual memory contents data, virtual disk contents data, and virtual hardware configuration data;
   allocating, in a first storage device, a free disk space for the virtual machine;
   determining, in a second storage device, a disk storage space storing the master VM image;
   mapping the determined disk storage space from the second storage device storing the master VM image and the allocated free disk space from the first storage device into a single virtual storage;
   designating the single virtual storage as a virtual storage for the master VM image and the virtual machine deployed on the target host, wherein the master VM image is directly accessible by the target host without needing to be copied to the target host;
   indicating a part of the designated single virtual storage corresponding to the mapped disk storage space as a storage location containing the master VM image;
   mapping a first physical address of the mapped disk storage space; and
   mapping a second physical address of the mapped free disk space, wherein the mapped first physical address and the mapped second physical address are a consecutive logical addresses of the virtual storage of the virtual machine.

2. The method of claim 1, further comprising:
   locating the determined free disk space remotely from the determined disk storage space.

3. The method of claim 1, wherein indicating the part of the virtual storage corresponding to the mapped disk storage space as the storage location containing the master VM image further comprises:
   recording a sub-range of the consecutive logical addresses corresponding to the mapped disk storage space as the storage location containing the master VM image.

4. The method of claim 3, further comprising:
   indicating the recorded sub-range of the consecutive logical addresses corresponding to the mapped disk storage space as the storage location containing the master VM image.

5. The method of claim 4, further comprising:
   setting the indicated sub-range of the consecutive logical addresses to a read-only mode for the virtual machine.

6. A computer system for storage management for deployment of a virtual machine, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   receiving a request to deploy a virtual machine on a target host based on a master virtual machine (VM) image, wherein the master VM image includes data associated with a current state of the virtual machine, wherein the current state of the virtual machine comprises virtual memory contents data, virtual disk contents data, and virtual hardware configuration data;
   allocating, in a first storage device, a free disk space for the virtual machine;
   determining, in a second storage device, a disk storage space storing the master VM image;
   mapping the determined disk storage space from the second storage device storing the master VM image and the allocated free disk space from the first storage device into a single virtual storage;
   designating the single virtual storage as a virtual storage for the master VM image and the virtual machine deployed on the target host, wherein the master VM image is directly accessible by the target host without needing to be copied to the target host;
   indicating a part of the designated single virtual storage corresponding to the mapped disk storage space as a storage location containing the master VM image;
   mapping a first physical address of the mapped disk storage space; and
   mapping a second physical address of the mapped free disk space, wherein the mapped first physical address and the mapped second physical address are a consecutive logical addresses of the virtual storage of the virtual machine.

7. The computer system of claim 6, further comprising:
   locating the determined free disk space remotely from the determined disk storage space.

8. The computer system of claim 6, wherein indicating the part of the virtual storage corresponding to the mapped disk storage space as the storage location containing the master VM image further comprises:
   recording a sub-range of the consecutive logical addresses corresponding to the mapped disk storage space as the storage location containing the master VM image.

9. The computer system of claim 8, further comprising:
   indicating the recorded sub-range of the consecutive logical addresses corresponding to the mapped disk storage space as the storage location containing the master VM image.

10. The computer system of claim 9, further comprising:
setting the indicated sub-range of the consecutive logical addresses to a read-only mode for the virtual machine.

11. A computer program product for storage management for deployment of a virtual machine, comprising:
one or more computer-readable tangible storage media and program instructions stored on at least one of the one or more computer-readable tangible storage media, the program instructions executable by a processor to cause the processor to perform a method comprising:
receiving a request to deploy a virtual machine on a target host based on a master virtual machine (VM) image, wherein the master VM image includes data associated with a current state of the virtual machine, wherein the current state of the virtual machine comprises virtual memory contents data, virtual disk contents data, and virtual hardware configuration data;
allocating, in a first storage device, a free disk space for the virtual machine;
determining, in a second storage device, a disk storage space storing the master VM image;
mapping the determined disk storage space from the second storage device storing the master VM image and the allocated free disk space from the first storage device into a single virtual storage;
designating the single virtual storage as a virtual storage for the master VM image and the virtual machine deployed on the target host, wherein the master VM image is directly accessible by the target host without needing to be copied to the target host;
indicating a part of the designated single virtual storage corresponding to the mapped disk storage space as a storage location containing the master VM image;
mapping a first physical address of the mapped disk storage space; and
mapping a second physical address of the mapped free disk space, wherein the mapped first physical address and the mapped second physical address are a consecutive logical addresses of the virtual storage of the virtual machine.

12. The computer program product of claim 11, further comprising:
locating the determined free disk space remotely from the determined disk storage space.

13. The computer program product of claim 11, wherein indicating the part of the virtual storage corresponding to the mapped disk storage space as the storage location containing the master VM image further comprises:
recording a sub-range of the consecutive logical addresses corresponding to the mapped disk storage space as the storage location containing the master VM image.

14. The computer program product of claim 13, further comprising:
indicating the recorded sub-range of the consecutive logical addresses corresponding to the mapped disk storage space as the storage location containing the master VM image.

* * * * *